Jan. 18, 1955 Y. PONSAR 2,699,653
APPARATUS FOR AUTOMATICALLY REGULATING
THE LEVEL OF LIQUIDS
Filed Feb. 19, 1948 7 Sheets-Sheet 1

INVENTOR
YVES PONSAR
BY
George W. Carey
ATTORNEY

INVENTOR
YVES PONSAR
BY
George H Corey
ATTORNEY

Jan. 18, 1955 Y. PONSAR 2,699,653
APPARATUS FOR AUTOMATICALLY REGULATING
THE LEVEL OF LIQUIDS
Filed Feb. 19, 1948 7 Sheets-Sheet 6

INVENTOR
YVES PONSAR

BY George H. Corey
ATTORNEY

Fig. 13

United States Patent Office 2,699,653
Patented Jan. 18, 1955

2,699,653

APPARATUS FOR AUTOMATICALLY REGULATING THE LEVEL OF LIQUIDS

Yves Ponsar, Grenoble, France, assignor to Ateliers Meyret-Beylier & Piccard-Pictet, Grenoble, France, a corporation of France Application February 19, 1948, Serial No. 9,576

Claims priority, application France February 24, 1947

14 Claims. (Cl. 61—28)

The present invention relates to apparatus for automatically regulating the level of liquids and has for an object the provision of apparatus applicable to canals and conduits, such as are used, for example, in conducting and distributing water for irrigation purposes, and which apparatus is adapted to maintain the liquid level or the volume of flow at a constant value or between closely determined limits.

The prior art arrangements for these purposes have generally included floats responsive to variations of the liquid level and acting on regulating gates. The floats used for detecting variations of level are usually at quasi constant immersion; that is to say, the variation of the immersion creating the force necessary for displacing the control apparatus and for overcoming the friction is small. The float is displaced, therefore, from a height equal to the variation of the liquid level less the variation of immersion and if the variation of the level is to be small, it is necessary that the variation of the immersion be very small and consequently that the surface or cross-sectional area of the float be considerable, so that the work developed in its displacement will be sufficient to cause the control units to traverse all of their useful course or stroke.

The prior patent of Danel, U. S. No. 2,168,117, dated August 1, 1939, discloses another arrangement and one usually requiring a small "decrement." However, in this particular device the gate and the float members are connected to the balance arm in a rigid manner, and in order to establish a condition of optimum equilibrium it is necessary that the balance arm be mounted with the axis of rotation close to and preferably at the water level that is to be regulated. Moreover, the usual construction of this prior apparatus does not allow it to sustain important forces such as are imposed when gates of larger sizes and larger flows are involved. Still further, the possibility of adjusting a given gate for regulation of the flow to a different level without introducing an undesirable decrement is limited. By "decrement" is meant the variation of the liquid level for which the apparatus makes the whole of its useful stroke in bringing about the regulation.

The present invention has for an object to provide an improved regulation apparatus or system wherein a float of variable immersion is associated with means establishing an opposing force varying with and substantially in accordance to the extent of travel of the float.

It is a further object to provide such an apparatus wherein the gate and the float have movements of translation, i. e., they may move up and down in rectilinear paths, and, also, wherein the point of pivotal support of the system may be positioned well above the level of the liquid being regulated.

The arrangements of the present invention utilize the equilibrium condition established by two opposing torques acting on a movable control device, such as a gate or valve. The valve is in equilibrium in all its positions as long as the level remains constant but the equilibrium position varies rapidly with a change of level within the limits of the regulatable decrement.

The two torques are:

1. A torque due to a displacement member such as a partially immersed float or to the hydraulic pressure exerting itself on a submerged piston.

2. An opposing torque created, for example, by a counterweight. This torque is variable during the course of travel or stroke in such manner as to balance in each position the torque exerted by the float or the piston, as long as the level remains constant. For example, in the case of the float, the opposing torque increases with the immersion of the float and acts in the same direction as the displacement of the float.

It is to be borne in mind that an opposing torque which increases in the course of the stroke cannot be realized with an ordinary elastic system or with an ordinary counterweight. It is realized in the system of the present invention by means of an elastic system or a balance in a state of unstable equilibrium which tends to deviate from its position of equilibrium.

The float and the counterweight (or other opposing force) can act on the movable elements of the system by means of simple arrangements of levers or pulleys and cables, or through the intermediary of cams arranged so that they modify the direct linear transmission of the force applied. In all these cases one and only one position of the movable elements corresponds to each position of the float or of the piston.

The floats used can be lighter than water. In such case they exert a thrust on the movable elements which by preference are situated outside of the water, such thrust being transmitted by means of a rod or shaft. Alternatively, the floats may be heavier than water and suspended, in which case they may be in stable equilibrium and need neither guiding nor any arrangement for a return connection under the water level. Hereinafter these heavier than water floats will nevertheless be called floats because the equilibrium is obtained by means of the thrust to which they are subjected.

In order better to understand the invention, reference will now be made, by way of example, to the accompanying drawings wherein are set forth by way of non-limitative examples several arrangements for carrying out the invention.

In the forms of the invention represented in the drawings the floats have always been shown suspended and heavier than the water for simplification of the description.

Figure 1:
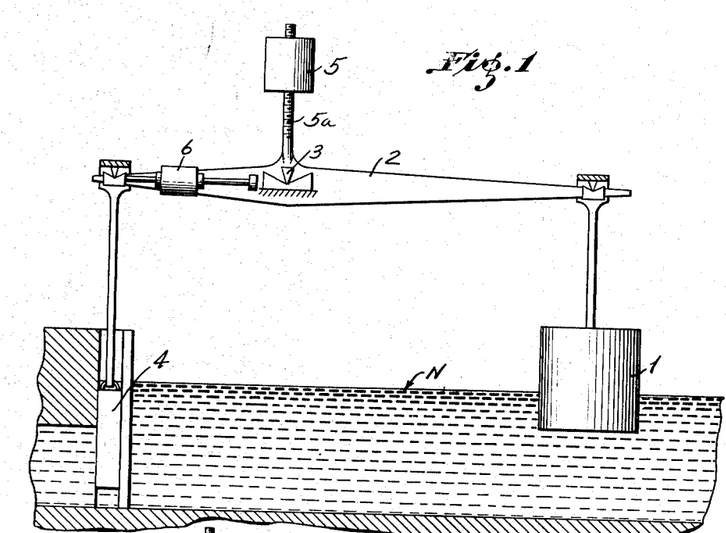
Figs. 1 and 2 are part longitudinal sections and part side elevations of two forms of the apparatus embodying a cylindrical float and effecting a linear transmission of the force to be applied.

In Fig. 1, the float 1 is shown as suspended at the extremity of a balance beam 2 mounted for pivotal movement about a fixed point 3. This balance beam at its other end supports a sluice gate 4 arranged to regulate the flow entering into the space where the float 1 is located. A counterweight 5 is adjustably mounted on the threaded rod 5a which is shown as fixed to and movable with the balance beam 2. The counterweight may be moved toward and away from the balance beam as required by the considerations set forth in detail below. A weight 6 movable along the balance beam is used to create a tare to account for differences in the weight of gate 4.

For any given level, if the system tends to move from a balanced position in a direction to further immerse the float, the upwardly directed buoyant force on the float increases, but the counterweight, deviating at the same time from the vertical, to the right in Fig. 1, produces a torque which increases at the same time as that which is due to the buoyant force but in the opposite direction, so that the balance may be maintained for different positions of the movable elements.

In all of the figures appropriate mechanical connections are used to provide for relative displacements of the different members. For example, in Fig. 1, the float 1 undergoes a certain lateral displacement without special disposition, while the gate 4 should be connected to the balance beam, for example, by a cable or by a link-rod in such manner as to permit the necessary lateral play of the end of the balance beam.

Figure 2:
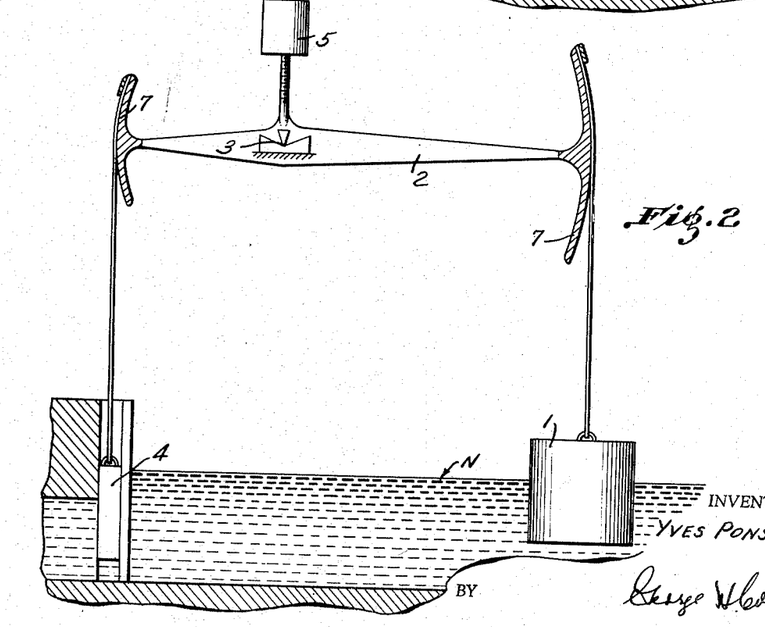

In Fig. 2, the balance beam is provided at its ends with arcuate arms 7 centered on the axis 3. The cables or chains for controlling the float 1 and the gate 4 are received at the upper side of each of these arms and run over the arcuate surfaces thereof thus eliminating all lateral displacements of these controls.

Figures 3, 4:
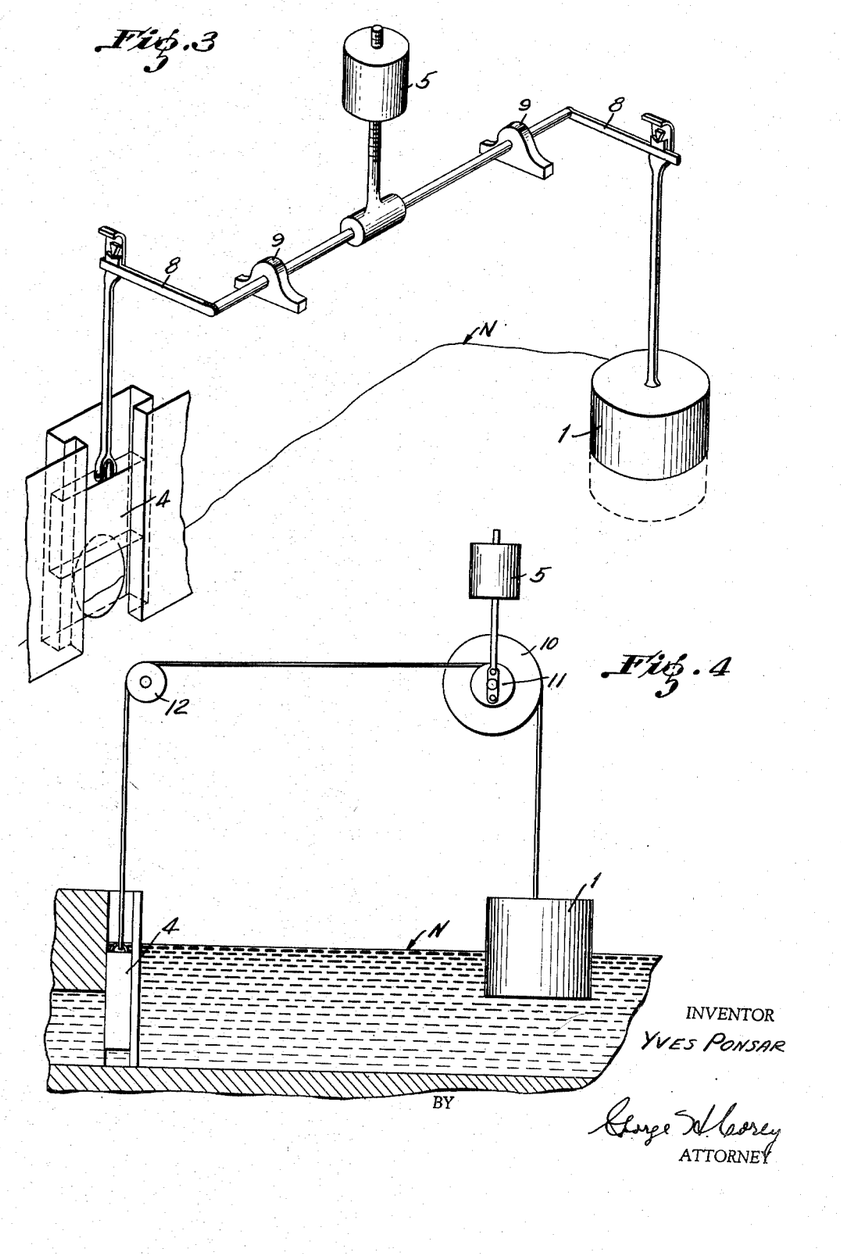
Fig. 3 is a perspective view in side elevation of another system effecting a linear transmission as in Figs. 1 and 2.
Fig. 4 is a part longitudinal section and a part side elevation of still another form of the apparatus employing a cylindrical float and effecting a linear transmission of the force to be applied through means of a system of pulleys and cables.

In Fig. 3, the balance beam 2 is replaced by two cranks 8 on the ends of a shaft 8a mounted in bearings 9. The cranks are respectively connected to the float 1 and the gate 4.

In Fig. 4 the balance beam is replaced by pulleys 10, 11 and 12 of suitable radius. The transfer of force is then assured by the cables. This permits of spacing of the float and the gate at remote points. The pulleys 10 and 11 of Fig. 4 are the mechanical equivalent of the arms of the balance beam 2 in Figs. 1 and 2. Where the term "arms" is used in this specification, it is intended as a generic term inclusive of mechanically equivalent structures such as the pulleys 10 and 11 of Fig. 4.

In all the cases it will be noticed that in order to modify the regulated level, it is sufficient to change the length of the suspension of the float, for example, by means of an interposed tackle or of an auxiliary balance beam or by other appropriate means.

All these arrangements present a decrement which is practically negligible for angular movements of small amplitude, only.

In order to illustrate the conditions required to balance the gate in two positions of the arrangement of Fig. 2, it may be assumed that:

$M$ = the total weight of the float
$\omega$ = the specific gravity of the liquid
$S$ = the cross-sectional area of the float
$b$ = the lever arm of the float
$h$ = the extent of immersion of the float
$Q$ = the weight of the gate
$a$ = the lever arm of the gate
$n$ = the decrement corresponding to the angle A
$P$ = the weight of the counterweight
$d$ = the distance of the counterweight from the beam pivot For the first condition, let us assume that the movable equipment is in balance with the counterweight 5 on the vertical of the knife edge 3. This condition may be represented by the equation:

$$(M - \omega Sh)b = Qa \qquad (1)$$

For the second condition, let us assume that the movable equipment is in balance in a position defined as the position attained by rotating the parts from the positions shown in the drawing counterclockwise through an angle A and that $n$ is the corresponding decrement. This condition may be represented by the following equation:

$$[M - \omega S(h - bA + n)]b = Qa + Pd \cdot \sin A \qquad (2)$$

By subtraction of these two equations and transposition, we have:

$$n = b\left(A - \frac{Pd}{\omega Sb^2} \cdot \sin A\right) \qquad (3)$$

which establishes the rule relating the decrement to the angle A.

If one selects $d$ so that $$Pd = \omega SB^2$$

then the equation for $n$ becomes $$n = b(A - \sin A)$$

It follows that when A is small, $n$ is practically negligible.

Considering now the apparatus of Fig. 1, Equation 1 as given above for Fig. 2 will apply to the horizontal condition of either Fig. 1 or Fig. 2. The equilibrium of the apparatus of Fig. 1 for a position defined by the angle A is shown by the following equation:

$$[M - \omega S(h - b \sin A + n)]b \cos A = Qa \cos A + Pd \sin A \qquad (4)$$

or $$[M - \omega S(h - b \sin A + n)]b = Qa + Pd \tan A$$

By subtraction of Equation 1 from the equation immediately above, derived from Equation 4, and transposition, we get the following equation:

$$n = b\left(\sin A - \frac{Pd}{\omega Sb^2} \tan A\right) \qquad (5)$$

Then, if $Pd = \omega Sb^2$ $$(n = b(\sin A - \tan A)$$

It again follows that if A is small, $n$ is negligible.

In the preceding calculations it has been assumed implicitly that the float, the gate and the counterweight were the only weights exerting a torque on the movable elements and that these were perfectly balanced in all positions. According to a modification of the invention, the center of gravity of the movable members may be removed from the axis of rotation. In this case it is the weight applied to the center of gravity which plays the role of the counterweight of the preceding modes of realization of the invention.

It is possible to put the movable connections of the float and of the gate at points higher than the axis of rotation of the movable system, providing the center of gravity is above such axis as in the embodiment above described.

In the case of the balance beam (Fig. 1) or the cranks (Fig. 3), the lever arms of the float and the gate vary as the cosine A and their displacements vary as the sine A. This modifies the preceding calculations and introduces a slightly different decrement.

It will be seen, therefore, that in order to eliminate the decrement, it is necessary either that the torque or turning moment of the counterweight be proportional to the angle of rotation (Figs. 2 and 4) or that the moment or torque due to the float change according to the same law as the torque of the counterweight (Figs. 1, 2, 3 and 4). This may be exemplified by the two solutions set forth below.

In the modifications of Figs. 5, 6, 7, 8 and 9, the couple due to the counterweight is modified by means of cams. The cam in each of these cases may be contoured to compensate for variations in the displacement angle, so that the maximum angular displacement of the counterweights in these embodiments is not subject to the limitation expressed above which is applicable to the embodiments of Figs. 1 to 4.

Figure 10:
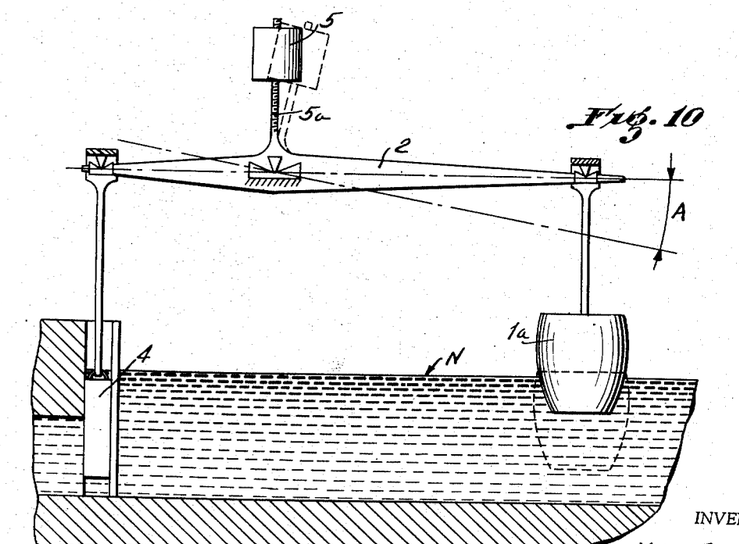
Fig. 10 is a part longitudinal section and a part side elevation of still another modification. In this case the float has a special form which causes it also to play the same role as a cam in modifying the torque of the float in proportion to the angle of rotation of the balance beam.

In the embodiment of Fig. 10, on the other hand, a float of varying cross-section is provided.

Figure 5:
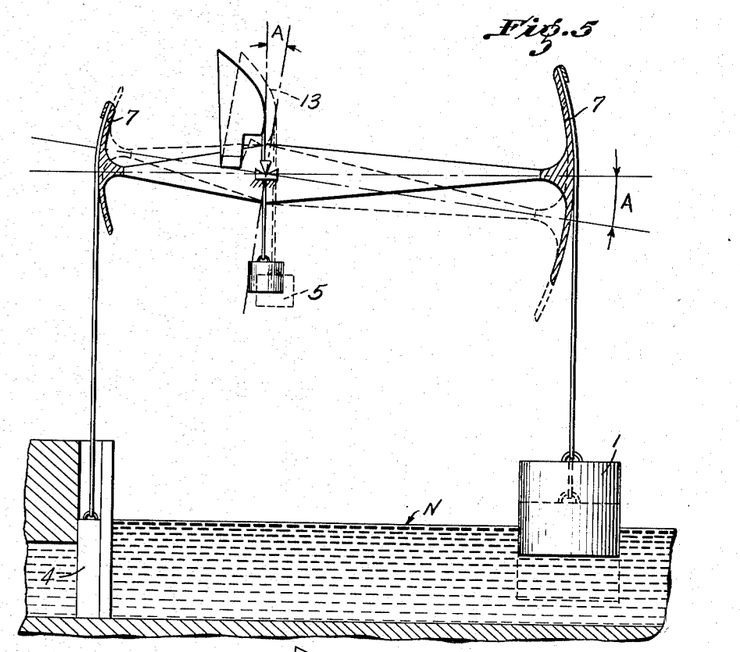
Figs. 5–9 are part longitudinal sections and part side elevations of still other modifications employing a cylindrical float in association with transmission means which includes a cam.

The embodiment of Fig. 5 is similar to that of Fig. 2, except that the counterweight 5 is suspended by a cable wound on a cam 13. The cam is so shaped and proportioned that the lever arm with which the counterweight acts with reference to the axis is, like the buoyant thrust on the float, proportional to angle A. Since the latter sinks proportionally to the angle of rotation, a balance takes place in all positions without decrement. If a balance beam is used instead of an arcuate arm, the cam will be modified slightly as compared with that of Fig. 5.

Figure 6:
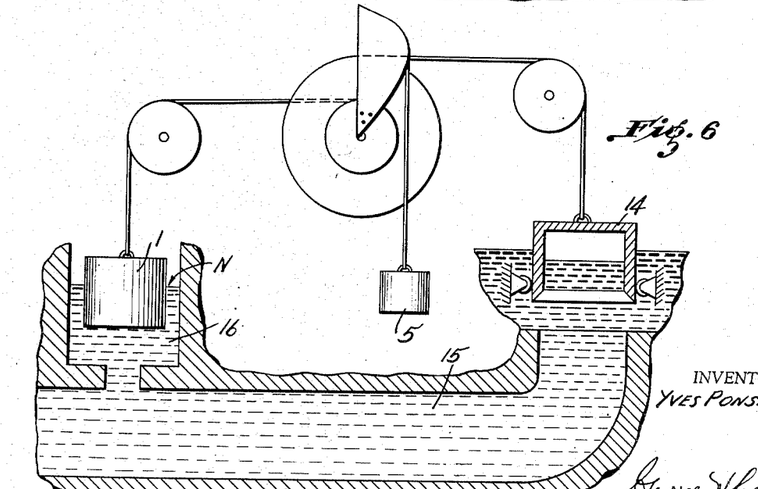

Fig. 6 shows the combination of a similar cam with an arrangement of pulleys similar to that shown in Fig. 4. The control gate 14 is shown as taking the form of a valve for closing a conduit 15 and the float 1 is positioned in a well 16 communicating with the conduit.

Figure 7:
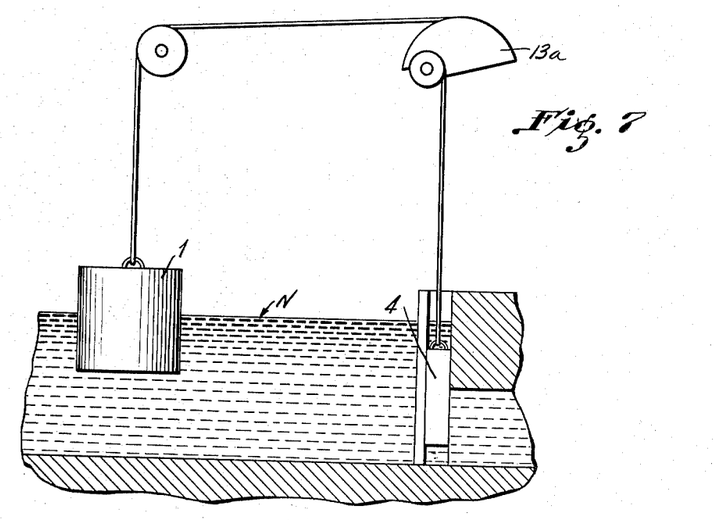

In Fig. 7, on the contrary, the counterweight is omitted. The gate itself plays this role by its own weight. The lever arm is changed by means of a cam 13a. The float acts through this variable lever arm to provide a constant sinking force or couple and to balance thus in all positions the force or couple due to the gate. This latter should then be perfectly balanced.

In a similar way the gate may be suspended from the cam. Likewise, the two preceding arrangements may be combined with use of two cams. This allows the apparatus a more extended movement.

Figure 8:
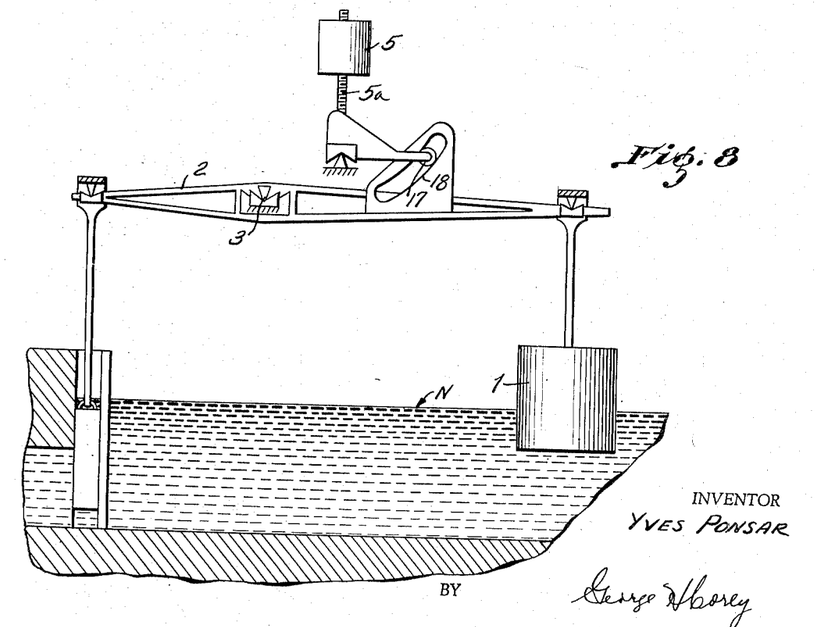
Figure 9:
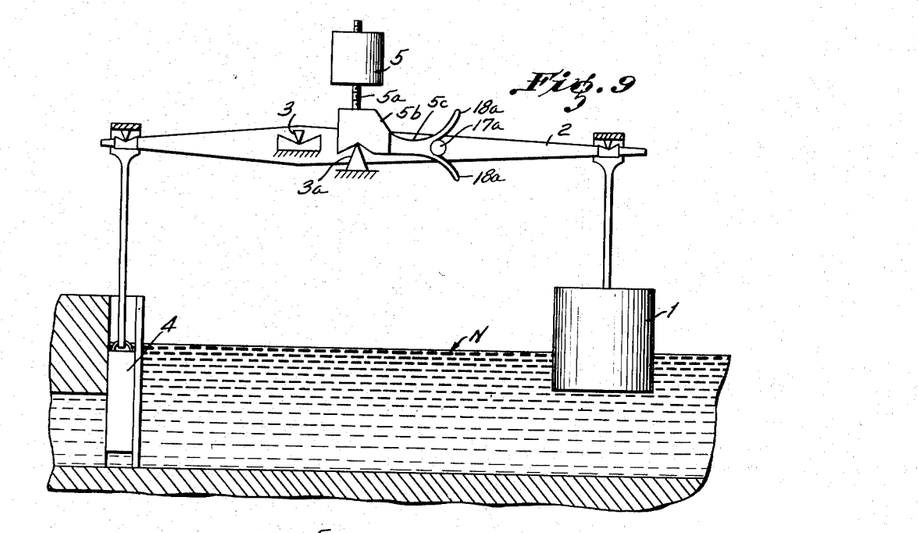

The arrangements of Figs. 8 and 9 also make use of cams in conjunction with a balance beam system.

In Fig. 8, the counterweight 5 is also mounted independently of the beam 2. It acts on the beam through the intermediary of a roller 17 which bears on a cam track 18 carried by the beam. The profile of this cam track assures the equality of concomitant variations of the opposing forces. In Fig. 9, the oscillating counterweight 5 and its supporting threaded rod 5a are mounted on a member 5b supported for pivotal movement on a knife edge 3a. The member 5b is provided with an arm 5c carrying at its free end a bifurcated cam track 18a which engages a roller 17a that is fastened to the beam 2.

All these embodiments (Figs. 5, 6, 7, 8 and 9) are therefore characterized by the use of either one or two cams and may provide a decrement as little as one desires or even none at all.

The same result may be obtained by modifying in a convenient manner the shape of the float. Fig. 10 shows one such float 1a used with the arrangement of Fig. 2.

Let $V_0$=the volume immersed in the initial position and $V_A$=the volume immersed in the position corresponding to the angle A.

Also let $m$=the arc of the circle defined by the angle A and radius $b$.

Let us assume further that we have a horizontal equilibrium without decrement. Then we have an equation similar to Equation 1 of Figs. 1 and 2 as follows:

$$(M - \bar{\omega}V_0)b = Qa \quad (6)$$

If we rotate the beam 2 clockwise through angle A, we have an equation similar to Equations 2 and 4 as follows:

$$(M - \bar{\omega}V_A)b = Qa + Pd \sin A \quad (7)$$

By subtraction we arrive at the following equation:

$$b(V_0 - V_A) = \frac{Pd}{\bar{\omega}} \sin A$$

which may be written as Equation 8 similar to Equations 3 and 5, since $$A = \frac{m}{b}$$

and $$V_0 - V_A = V_m$$

$$V_m = -\frac{Pd}{\bar{\omega}b} \sin \frac{y}{b} \quad (8)$$

By differentiation we obtain the section of the float corresponding to the angle A, i. e., $$S_A = \frac{Pd}{\bar{\omega}b^2} \cos A$$

The meridian line or profile of the float thus calculated assures for all the useful travel of the float a decrement which is nil, assuming the gate to be balanced.

This type of float may advantageously be applied to all the arrangements of transmissions without cams, for example, to the arrangements of Figs. 2 and 4. In the modifications involving the use of balance beams or cranks (Figs. 1 and 3), a simple similar calculation will determine the correct but slightly different shape of the float.

According to the invention a piston 19 may be used in place of a float to create the torque. For example, by feeding the piston from above, the piston is subjected to a force which varies with the liquid level and with the position of the piston, and which permits of the use, to create the opposing torque, of a conventional spring system or a counterweight above the axis and of which the torque also varies with the position of the piston, but in opposition to it.

Figure 11:
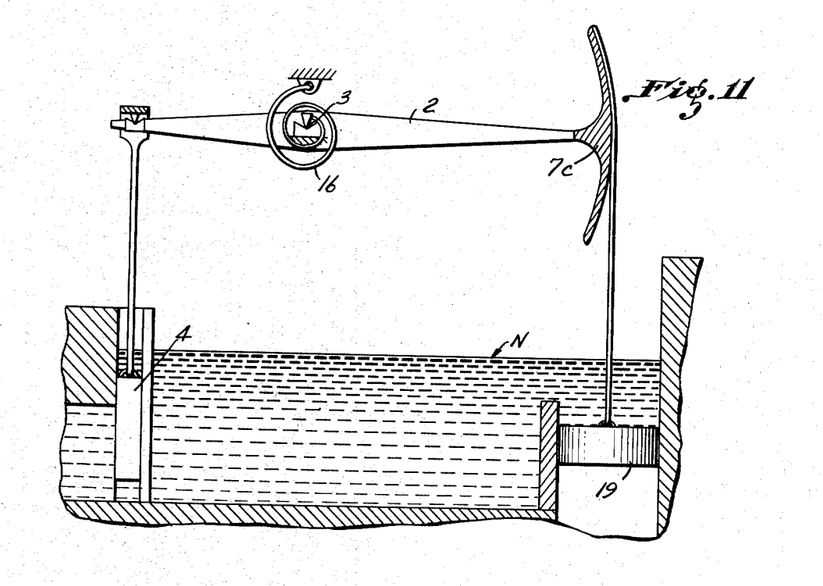
Figs. 11 and 12 are part longitudinal sections and part side elevations showing still other modifications. In these instances the apparatus employs a piston in place of a float.

Fig. 11 shows one such arrangement including a balance beam 2 and a gate 4. In place of the float is found a piston 19 supplied from above and suspended from an arcuate arm 7c centered on the axis 3 and carried on the outer end of the balance beam 2. The force or torque proportional to the angular displacement may be exerted by a spiral spring 16 or a torsion bar or any other appropriate elastic element.

Figure 12:
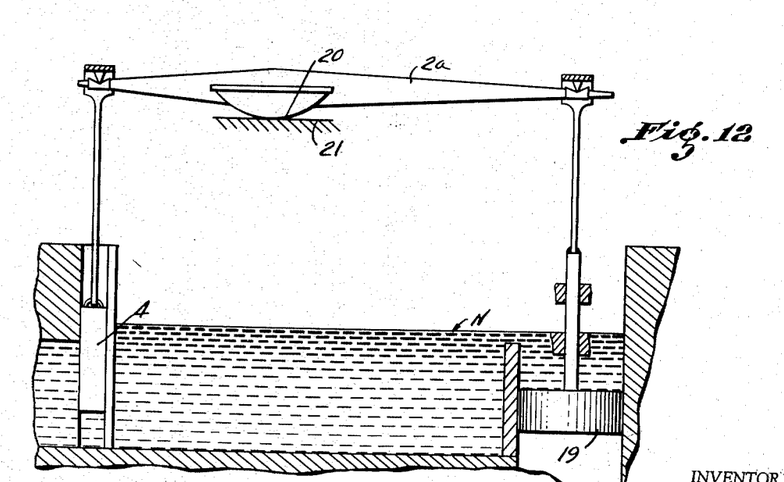

Finally, following the invention, one may equally use the system of Fig. 12 wherein a piston 19 is supplied from above and is connected to the balance beam 2a which includes as the fulcrum a cylindrical surface 20 rolling on a base 21. The more the piston is submerged, the more the lever arm of the gate lengthens in increasing the opposing torque created by the weight of the gate. At the same time the lever arm on which the piston acts decreases and the center of gravity is displaced with reference to the instantaneous center of rotation.

The invention is applicable also to the regulation of the difference between two levels of liquid. Thus in Fig. 13, two floats 1 and 1' are suspended in two wells 16 and 16'. These floats are suspended from a balance beam provided with a counterweight compensator 5 and acting on the gate 4 as in Fig. 1. The movable elements are in indifferent balance for a difference of level $h$ whatever be the absolute value of the two levels. If the difference of the levels varies, it rotates the beam until the gate has brought the discharge back to a value such that the predetermined difference of level is realized. As the movable elements should remain insensible to equal variations of the two levels, the two floats are given equal sections and equal lever arms.

Figure 13:
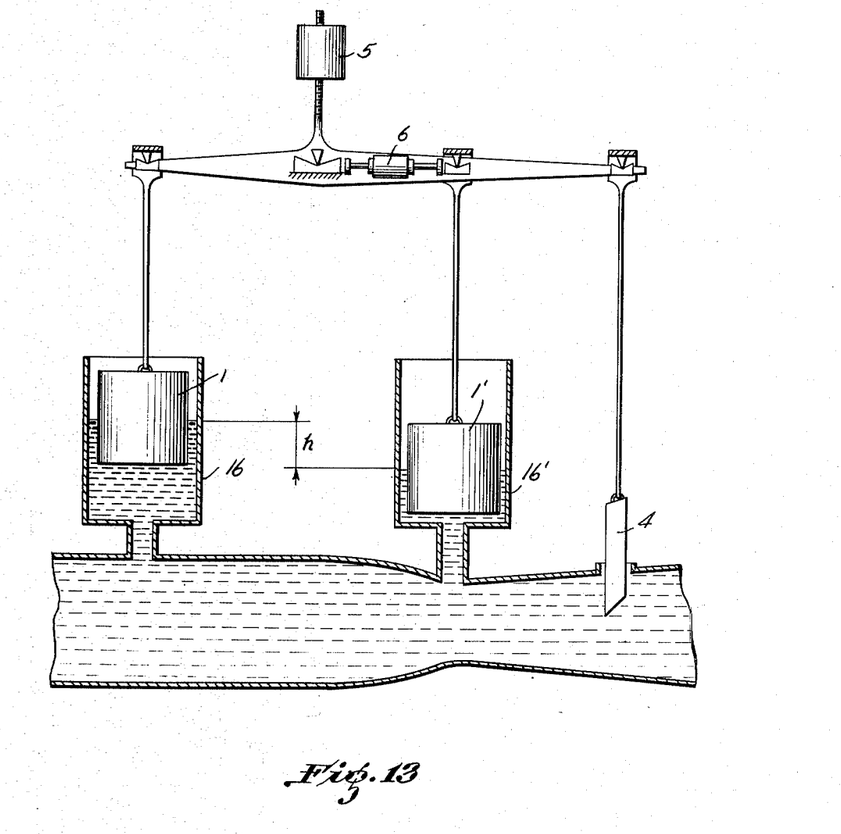
Fig. 13 is still another modification wherein a plurality of floats are utilized to bring about a regulation of the difference between two levels.

This arrangement insures a constant discharge at any point whatever of a conduit filled with a liquid under pressure as, for example in Fig. 13. It is sufficient to introduce a Venturi into the conduit and to establish communication between the conduit and the two wells by static pressure connections, the first at a point upstream, the second with the neck of the Venturi.

In adapting the embodiments of the invention described above, steps should be taken to lessen as much as possible any frictions of the gate because these reduce the sensitivity of the apparatus. Moreover, it will be understood that it is aimed to balance the gate not only statically but also dynamically; that is to say, the gate should not undergo hydrodynamic forces varying in the course of movement of the gate; otherwise it is very evident that the balance of the movable elements would be distorted. In certain cases, however, unbalanced gates may be used provided the extent of variation of the hydrodynamic forces with relation to the extent of travel is known and this is taken into account in determining the shape of the cam.

It is to be understood that known damping means may be introduced into the system of the present invention for the purpose of further adding to the stability thereof. It is further to be understood that the invention is by no means limited to the examples particularly described, and that in its broader aspects it is not limited to arrangements for the control of gates. It may, for example, be utilized more generally for the detection of variations in liquid level and to control indicators of liquid levels, as well as in apparatus for measuring the flow of liquids and transmitting an indication of such measurement to a distance. Likewise, various changes in the details of the construction and arrangement of the parts may be made without departing from the invention which is not to be deemed as limited otherwise than as indicated by the language of the appended claims.

I claim:

1. Apparatus for regulating the level of a first body of liquid having flow communication with a second body of liquid of different head, comprising a gate valve movable through a range of positions to control the flow of liquid between said bodies, a movable cylindrical float partially immersed in said one body of liquid and thereby subjected to a buoyant force varying with the liquid level and with the float elevation, a balance beam fulcrumed on a knife-edge pivot, means connecting one end of the beam to the float including a knife-edge pivot at said one end, means connecting the other end of the beam to the gate valve including a link connected at its lower end to the gate valve and having at its upper end a knife-edge pivot connection with the opposite end of the beam, said beam and said valve connecting means cooperating to counterbalance the resultant force acting on said float corresponding to a predetermined liquid level and a predetermined float position, and means for counterbalancing the variations of said force due to vertical movements of the float so that as long as the first body of liquid remains at said predetermined level the float and gate are in equilibrium throughout their range of movement, said counterbalancing means comprising a counterweight, a rod connecting the counterweight to said balance beam adjacent its fulcrum, and means for adjustably attaching the counterweight to the rod, said rod and beam being related to the float so that the counterweight moves through a limited range of positions above and substantially in alignment with the fulcrum.

2. Apparatus for regulating the level of a first body of liquid having flow communication with a second body of liquid of different head, comprising a valve movable vertically through a limited range of positions to control the flow of liquid between said bodies, a vertically movable displacement member at least partially immersed in said first body of liquid and subjected to a force varying with the extent of immersion of said displacement member in said first body of liquid, a fixed support above the level of said first body of liquid, a balance member pivoted on said fixed support and having arms extending respectively over said valve and said displacement member, an articulated connection between said valve and the adjacent arm of said balance member at a point spaced from the pivot of said balance member so that the weight of said valve applies a torque to the balance member, a second articulated connection between said displacement member and the arm of said balance member adjacent thereto at a point spaced from said pivot in the opposite sense from said first point, said second connection being arranged in opposition to said first connection so that the torque due to the displacement member opposes the torque due to the valve, said valve and said displacement member being movable vertically in opposite directions by said articulated connections concurrently with rotation of said balance member through respective limited ranges corresponding to the range of movement of the valve, and separate counterbalance means supported by said balance member adjacent the pivot thereof and rotatable therewith to apply a counterbalancing force varying directly and in the opposite sense to variations in the torque exerted by said displacement member due to vertical movement of said displacement member relative to said liquid level.

3. Apparatus for regulating the level of a first body of liquid having flow communication with a second body of liquid of different head, comprising a gate valve movable through a range of positions to control the flow of liquid between said bodies, a movable float partially immersed in said one body of liquid and thereby subjected to a buoyant force varying with the liquid level and with the float elevation, a balance beam fulcrumed on a knife-edge pivot, means connecting one end of the beam to the float including a knife-edge pivot at said one end, means connecting the other end of the beam to the gate valve including a link connected at its lower end to the gate valve and having at its upper end a knife-edge pivot connection with the opposite end of the beam, said beam and said connecting means cooperating to counterbalance the resultant force acting on said float corresponding to a predetermined liquid level and a predetermined float position, and means for counterbalancing the variations of said force due to vertical movements of the float so that as long as the body of liquid remains at said predetermined level the float and gate are in equilibrium throughout their range of movement, said counterbalancing means comprising a counterweight, a rod connecting the counterweight to said balance beam adjacent its fulcrum, and means for adjustably attaching the counterweight to the rod, said rod and beam being related to the float so that the counterweight moves through a limited range of positions above and substantially in alignment with the fulcrum.

4. Apparatus for regulating the level of a first body of liquid having flow communication with a second body of liquid of different head, comprising a gate valve movable through a range of positions to control the flow of liquid between said bodies, a movable float partially immersed in said first body of liquid and thereby subjected to a buoyant force varying with the liquid level and with the extent of immersion of said float, a fixed support, a balance member pivoted on said fixed support and having two arms extending in opposite directions from said pivot, means connecting one arm to the float including a pivot on said one arm, means connecting the other arm to the gate valve including a link connected at its lower end to the gate valve and having at its upper end a pivot connection with said other arm, said balance member and said connecting means cooperating to counterbalance the resultant force acting on said float corresponding to a predetermined liquid level and a predetermined float position, and means for counterbalancing the variations of said force due to vertical movements of the float so that as long as the body of liquid remains at said predetermined level the float and gate are in equilibrium throughout their range of movement, said counterbalancing means comprising a counterweight, a rod connecting the counterweight to said balance beam adjacent its fulcrum, and means for adjustably attaching the counterweight to the rod, said rod and beam being related to the float so that the counterweight moves through a limited range of positions above and substantially in alignment with the fulcrum.

5. Apparatus for regulating the level of a first body of liquid having flow communication with a second body of liquid of different head, comprising a gate valve vertically movable through a range of positions to control the flow of liquid between said bodies, a movable cylindrical float partially immersed in said first body of liquid and thereby subjected to a buoyant force varying with the extent of the immersion of the float in said first body of liquid, a fixed support above the level of said first body of liquid, a balance member having arms extending respectively over said valve and said float and pivoted on said fixed support, an articulated connection between said valve and the adjacent arm of said balance member at a point spaced from the pivot of said balance member so that said valve applies a torque to said balance member, a second articulated connection between said float and the arm of said balance member adjacent thereto at a point spaced from said pivot in the opposite sense from said first point, said second connection being arranged in opposition to said first connection so that the torque due to the float opposes the torque due to the valve, said valve and said float being moved vertically in opposite directions by said articulated connections concurrently with rotation of said balance member through respective limited ranges corresponding to the range for movement of the valve, and separate counterbalance means supported by said balance member adjacent the pivot thereof and rotatable therewith to apply a counterbalancing force varying directly and in the opposite sense to variations in the torque exerted by said float due to vertical movement of said float relative to said liquid level.

6. Apparatus for regulating the level of a first body of liquid having flow communication with a second body of liquid of different head, comprising a valve movable vertically through a range of positions and effective to control the flow of liquid between said bodies, a movable displacement member at least partially immersed in said first body of liquid and subject to a vertically acting force varying with the extent of immersion of said member in said first body of liquid, a balance member rotatable about a fixed axis above the level of said first body of liquid and having two lever arms extending from said axis, first means articulatingly connecting the valve to one of said arms and transmitting thereto a first force determined by the weight of the valve and having a first moment acting in a direction to rotate said balance member in one sense, second means articulatingly connecting the displacement member to the other arm in opposition to said first connecting means and transmitting to said other arm a second force varying with said vertically acting force, said second force having a second moment acting in a direction to rotate said balance member in a sense opposite to that of said first moment, said balance member and said second connecting means being effective upon angular movement of the balance member to move said displacement member to vary said second moment as a predetermined function of the angular position of said member, a counterweight, and means operatively connecting said counterweight to said balance member for movement concurrently therewith for counterbalancing the variation of said second moment due to the vertical movement of said displacement member relative to the liquid level of said first body of liquid so that the variation of said second moment is counterbalanced and so that changes in the angular position of the balance member do not affect the balance thereof.

7. Level regulating apparatus as defined in claim 6, in which said arms of the balance member have at their ends pulley surfaces of arcuate cross-section concentric with said axis; said second articulatingly connecting means comprises a cable attached to said balance member and extending over said pulley surface, said cable and pulley surface being effective to maintain a constant moment arm for said second force as the balance member moves angularly, so that said displacement member moves vertically during angular movement of the balance member and the elevation of the displacement member varies directly with the angular position of the balance member.

8. Level regulating apparatus as defined in claim 6, in which said second articulating connecting means comprises a pivot connection with said other arm, so that when said balance member moves angularly, the displacement member has vertical and horizontal components of motion, both components varying according to functions of the angular position of said member.

9. Apparatus for regulating the level of a first body of liquid having flow communication with a second body of liquid of different head, comprising a valve movable vertically through a range of positions and effective to control the flow of liquid between said bodies, a movable displacement member at least partially immersed in said first body of liquid and subject to a vertically acting first force varying with the extent of immersion of said member in said first body of liquid, a balance member rotatable about a fixed axis above the level of said first body of liquid and having two lever arms extending from said axis, first means articulatingly connecting the valve to one of said arms and transmitting thereto a second force determined by the weight of the valve and having a second moment acting in a direction to rotate said balance member in one sense, said one arm being sufficiently long with respect to said range of valve positions so that the total angular movement of the balance member is small, second means articulatingly connecting the displacement member to the other arm in opposition to said first connecting means and transmitting to said other arm said first force, said first force having a first moment acting in a direction to rotate said balance member in a sense opposite to that of said second moment, said balance member and said second connecting means being effective upon angular movement of the balance member to move said displacement member to vary said first moment according to a predetermined function of the angular position of said member, a counterweight, and a rigid rod means connecting said counterweight to said balance member and supporting said counterweight at a level above said axis for movement in a path concentric with said axis throughout the total angular movement of the balance member, whereby the moment arm of said counterweight is varied substantially in accordance with the same predetermined function of the angular position, but in an opposite sense, so that changes in the angular position of the balance member do not affect the balance thereof.

10. Level regulating apparatus as defined in claim 9, in which said balance member is a generally horizontally extending beam, and said articulatingly connecting means include pivots at the ends of said beam.

11. Level regulating apparatus as defined in claim 9, in which said balance member is a generally horizontally extending beam, and said articulatingly connecting means include means at the ends of said beam defining pulley surfaces of arcuate cross-section concentric with said axis, and cables attached to said valve and said displacement member and extending over said pulley surfaces.

12. Level regulating apparatus as defined in claim 9, in which said balance member comprises a shaft, said arms are crank arms spaced along said shaft, and said rigid rod forms another crank arm fixed on said shaft.

13. Apparatus for regulating the level of a first body of liquid having flow communication with a second body of liquid of different head, comprising a valve movable vertically through a range of positions and effective to control the flow of liquid between said bodies, a movable displacement member at least partially immersed in said first body of liquid and subject to a vertically acting first force varying with the extent of immersion of said member in said first body of liquid, a balance member rotatable about a fixed axis above the level of said first body of liquid and having two lever arms extending from said axis, first means articulatingly connecting the valve to one of said arms and transmitting thereto a second force determined by the weight of the valve and having a second moment acting in a direction to rotate said balance member in one sense, second means articulatingly connecting the displacement member to the other arm in opposition to said first connecting means and transmitting to said other arm said first force, said first force having a first moment acting in a direction to rotate said balance member in a sense opposite to that of said second moment, said balance member and said second connecting means being effective upon angular movement of the balance member to move said displacement member to vary said first moment according to a predetermined function of the angular position of said balance member, and counterbalance means having at least a portion thereof connected to said balance member for concurrent movement therewith, said counterbalance means being effective to apply to said balance member a moment which varies as said balance member moves substantially in accordance with the same predetermined function of the angular position, but in an opposite sense, so that changes in the angular position of the balance member do not affect the balance thereof as long as said first body of liquid remains at a determined level.

14. Apparatus for regulating the level of a first body of liquid having flow communication with a second body of liquid of different head, comprising a valve movable vertically through a range of positions and effective to control the flow of liquid between said bodies, a movable displacement member at least partially immersed in said first body of liquid and subject to a vertically acting first force varying with the extent of immersion of said body in said first body of liquid, a fixed support above the level of said first body of liquid, a balance member fulcrumed on said support and having two lever arms extending from said axis, first means articulatingly connecting the valve to one of said arms and transmitting thereto a second force determined by the weight of the valve and creating a second moment acting in a direction to rotate said balance member in one sense, second means articulatingly connecting the displacement member to the other arm in opposition to said first connecting means and transmitting thereto said first force and thereby creating a first moment acting in a direction to rotate said balance member in a sense opposite to that of said second moment, said balance member and said second connecting means being effective upon angular movement of the balance member to move said displacement member to vary said first moment according to a predetermined function of the angular position of said balance member, and moment varying means operatively connected to said balance member for concurrent movement therewith and affected by angular movement thereof to vary a moment applied thereto substantially in accordance with the same predetermined function of the angular position, but in an opposite sense, so that changes in the angular position of the balance member do not affect the balance thereof.

References Cited in the file of this patent

UNITED STATES PATENTS

| Number | Name | Date |
| --- | --- | --- |
| 326,347 | Taylor | Sept. 15, 1885 |
| 654,441 | Cook | July 24, 1900 |
| 870,256 | Smith | Nov. 5, 1907 |
| 917,381 | Twiford | Apr. 6, 1909 |
| 1,037,413 | Bartlett | Sept. 3, 1912 |
| 1,063,971 | Hilscher | June 10, 1913 |
| 1,363,283 | Smithers | Dec. 28, 1920 |
| 1,532,829 | McMillan | Apr. 7, 1925 |
| 1,770,913 | Kermor | July 22, 1930 |
| 2,168,117 | Danel | Aug. 1, 1939 |
| 2,186,128 | Ullstrand | Jan. 9, 1940 |

FOREIGN PATENTS

| Number | Country | Date |
| --- | --- | --- |
| 19,216 | Great Britain | Sept. 6, 1904 |
| 227,258 | Great Britain | Jan. 15, 1925 |
| 444,394 | Great Britain | Mar. 20, 1936 |